United States Patent

Sharpe et al.

Patent Number: 5,721,743
Date of Patent: Feb. 24, 1998

[54] METHOD OF AND SYSTEM FOR COMMUNICATING MESSAGES

[75] Inventors: Anthony K. Sharpe, Taversham; Peter J. Mabey, Comberton, both of England

[73] Assignee: U.S. Philips Corporation, New York, N.Y.

[21] Appl. No.: 505,933

[22] Filed: Jul. 24, 1995

[30] Foreign Application Priority Data

Jul. 28, 1994 [GB] United Kingdom .................... 9415197
Jun. 6, 1995 [GB] United Kingdom .................... 9511462

[51] Int. Cl.$^6$ .................................................. H03M 13/00
[52] U.S. Cl. ......................................................... 371/37.7
[58] Field of Search ............................ 371/32, 35, 37.7, 371/42

[56] References Cited

U.S. PATENT DOCUMENTS 5,237,320  8/1993  Sato et al. ............................. 340/825.44
5,426,653  6/1995  Hayes et al. ............................ 371/36

FOREIGN PATENT DOCUMENTS 0117595    5/1984  European Pat. Off. .
0117595A3  9/1984  European Pat. Off. .......... H04L 1/10
0229353    7/1987  European Pat. Off. .
2038145    7/1990  United Kingdom .
8604476    7/1986  WIPO .............................. H04Q 7/02

OTHER PUBLICATIONS

Chase, "Code Combining–A Maximum–Likelihood Decoding Approach for Combining an Arbitrary Number of Noisy Packets", IEEE Transactions on Communications, vol. COM–33, No. 5, May 1985, pp. 385–393.

"Method to Provide Software Calculation of a 32–Bit Frame Check Sequence, a Byte at a Time", IBM Tech. Disclosure Bulletin, vol. 30, No. 12, May, 1988, pp. 458–464.

*Primary Examiner*—Stephen M. Baker
*Attorney, Agent, or Firm*—Arthur G. Schaier

[57] ABSTRACT

A method of, and system for, communicating messages in an environment which is subject to fading, in which data to be transmitted is encoded and formatted, a checksum is determined for said encoded and formatted data and in which the checksum is added to an address code word which is concatenated with the encoded and formatted message code words to form a message. A receiver is energized for receiving transmissions in its predetermined frame. In response to recognizing its address code word the concatenated code words are decoded and stored. As each code word is stored, substantially simultaneously a checksum is computed for the message assembled so far and is compared to the checksum in the address code word, if and when they are equal it is concluded that a complete message has been received and further analysis of the stored message is terminated. In a variant of the present invention each message is transmitted at least twice and a final version of the message is assembled code word by code word by comparing the corresponding code words in the respective transmissions and selecting the better (or best) version. As the final version is being assembled the checksum is computed and compared to determine the end of the message. In a further variant the detection of an address or idle code word following a message code word is treated as the beginning of a new message and the computed checksum is used when an undecodable code word is received.

16 Claims, 7 Drawing Sheets

| ADD 1 | M1 | M2 | M3 | ADD 2 | M1 | M2 | M3 | ADD 3 | M1 | M2 | M3 | ADD 4 | M1 | M2 |

FIG. 4A

| ADD 1 | M1 | M2 | M3 | ADD 2 | M1 | M2 | M3 | ADD 3 | M1 | M2 | M3 | ADD 4 | |

FIG. 4B

| ADD 1 | M1 | M2 | M3 |

METHOD OF AND SYSTEM FOR COMMUNICATING MESSAGES

BACKGROUND OF THE INVENTION

1. Field of the Invention

The present invention relates to a method of, and system for, communicating messages and particularly to improving the message success rate for a carrier to noise power ratio. The present invention also relates to component parts of the system namely generally fixed site primary stations and generally moveable secondary stations.

2. Discussion of the Related Art

For convenience of description the present invention will be described with reference to a high speed paging system which has been evolved from, and is compatible with, POCSAG or CCIR Radiopaging Code No 1, the details of which are disclosed in "The Book of the CCIR Radiopaging Code No 1" available from the Secretary, RCSG, British Telecom, Radiopaging, 23 Howland Street, London W1P 6HQ. In accordance with POCSAG, paging messages are transmitted in batches each of which comprises a synchronisation code word and 8 frames each comprising 2 code words. Each pager or secondary station is assigned to a particular frame which means that if a paging signal is transmitted by a primary station for a particular pager, it will be in a predetermined one of the 8 frames. Each POCSAG pager is controlled to power up in order to be able to receive the synchronisation (sync) code word and again for the duration of its particular frame. In the case of messages, the message code words are concatenated with the address code word. The POCSAG address and message code words each comprise 32 bits of which the first bit has a value "0" for an address code word and "1" for a message code word. Both types of code words at bit positions 22 to 31 comprise cyclic redundancy check (CRC) bits and the bit 32 provides an even parity. At the end of a message any waiting address code words will be transmitted, starting with the first appropriate to the first free frame. In the absence of an appropriate address code word, an idle code word, which is a non-allocated address code word is transmitted. By using address or idle code words in this way it is unnecessary to send specific end of message code words and/or message length indicators which not only reduces the time required to transmit a message but also increases its chances of being received successfully.

The use of a 10 bit CRC provides the capability of 2-bit error correction. Interleaving the bits of blocks of successive code words will provide an improved degree of protection particularly in the event of fades. Decoded address code words occurring in a particular frame can be compared against the addresses stored by the pager and if it is determined that there is adequate correspondence between them, the message is accepted. However, this option is not available with message code words. European Patent Specification EP-B1-0 117 595 discloses the use of checksums as a means of protecting against falsing, that is incorrect correction by one or more data code words when using 2-bit error correction.

For high rate data messages the effects of a fade can be more significant because for a fade of a particular duration more bits will be lost than for messages transmitted at a lower bit rate. A known technique for improving the success rate is to retransmit a message one or more times and at the secondary station a code word by code word comparison is made and the code word which is judged to be correct, for example by a majority decision when there are 2 re-transmissions. Nevertheless a problem which remains is that a fade may render it unclear when one message has ended and another has begun.

SUMMARY OF THE INVENTION

It is an object of the present invention to improve the message success rate for any particular carrier to noise power ratio. According to a first aspect of the present invention there is provided a method of transmitting and receiving data messages, comprising the steps of compiling a message from a plurality of code words, calculating a checksum for that message and embedding the checksum in the message; transmitting the message; receiving the transmitted message; recovering the code words; storing successive code words; after each code word has been stored, determining the checksum using the same algorithm as used to determine the checksum in the originally transmitted message, and, if the checksum so determined corresponds to that embedded in the originally transmitted message, recording this correspondence.

The method in accordance with the present invention may be configured to operate in a number of ways, for example treating the correspondence between the calculated and received checksum as an indication that the message is complete or using said correspondence as an indication that the message is complete in the absence of receiving, due for example to a fade, the next following address code word or idle code word. In a system in which each message is transmitted at least twice a final version of the message is assembled code word by code word by for example comparing corresponding code words in the first version of the received message and each repetition thereof; after each code word has been added to the final version of the message being assembled, a checksum is determined using the same algorithm as used to calculate the checksum embedded in the message as transmitted, and, if the checksum so determined corresponds to that embedded in the message as transmitted, the correspondence is recorded and is used as described above.

According to a second aspect of the present invention there is provided a system for transmitting and receiving data messages, comprising means for calculating and embedding a checksum in each message, means for transmitting the message, means for receiving the transmitted message, means for error correcting the message, if required, means for storing successive code words, means responsive to the addition of each code word to the stored code words, for determining a checksum using the same algorithm as was used to calculate the checksum in the originally transmitted message, and means for recording when the determined checksum corresponds to that embedded in the originally transmitted message.

According to a third aspect of the present invention there is provided a primary station for use in the system in accordance with the second aspect of the present invention comprising means for encoding and formatting data to be transmitted, means for determining a checksum for said encoded and formatted data and embedding the checksum in the formatted data to form a message, and means for transmitting the message.

According to a fourth aspect of the present invention there is provided a secondary station for use in the system in accordance with the second aspect of the present invention comprising means for receiving a transmitted message, means for decoding code words comprising the message, means for storing the decoded code words, means responsive to the storing of each code word for computing a checksum, means for comparing the checksum computed with the checksum embedded in the formatted message as transmitted, and means for recording when the computed and embedded checksums correspond.

The present invention is based on the realization that when the checksum, computed each time a correct code word is added to a message being assembled by the secondary station, equals that originally transmitted that it can be concluded with a degree of confidence that a complete message has been assembled.

Techniques such as bit interleaving may be used to increase protection against the effects of fading.

BRIEF DESCRIPTION OF THE DRAWINGS

The present invention will now be described, by way of example, with reference to the accompanying drawings, wherein.

DETAILED DESCRIPTION OF THE PREFERRED EMBODIMENTS

In the drawings the same reference numerals have been used to identify corresponding features.

Figure 1:
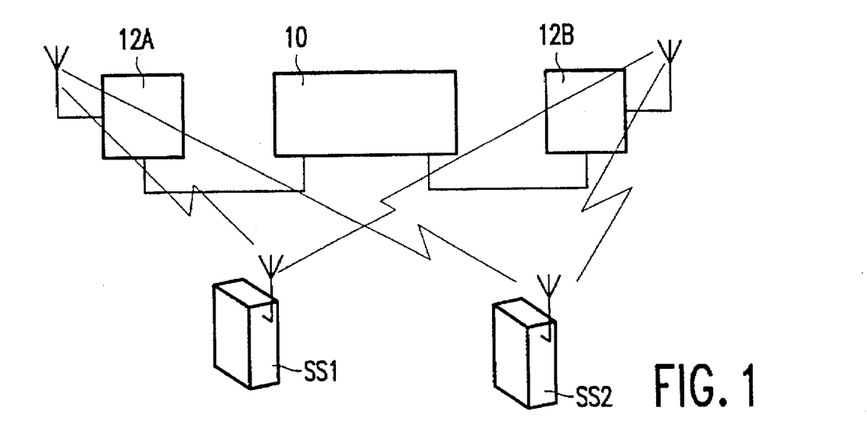
FIG. 1 is a diagram illustrating a paging system.

The paging system shown in FIG. 1 comprises a paging controller 10 which receives paging requests and formats the addresses and messages in accordance with the protocol being used. The paging controller 10 is connected to a plurality of base station transmitters 12A,12B which are operated in a quasi-synchronous mode. A plurality of digital pagers or secondary stations SS1,SS2 are free to roam within the coverage area of the base stations 12A,12B. The operation of, and battery economising features of, the pagers SS1,SS2 correspond to that determined by the protocol being followed.

Figure 2:
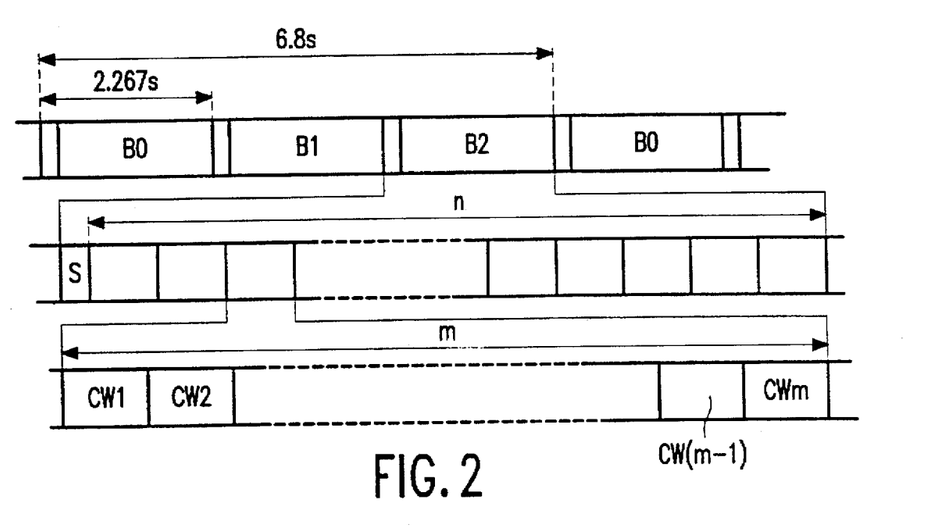
FIG. 2 is a diagram illustrating one example of a batch structure.
Figure 3A:
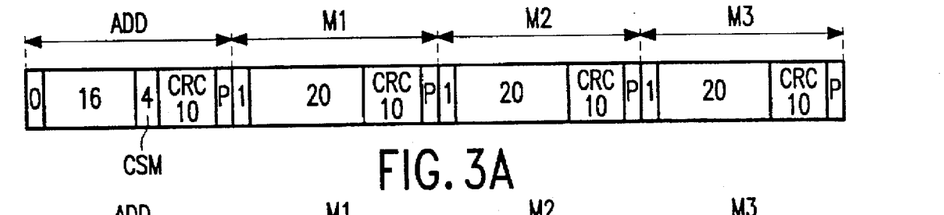
FIG. 3A is a diagram illustrating a first arrangement of an address code word and concatenated message code words.
Figure 3B:
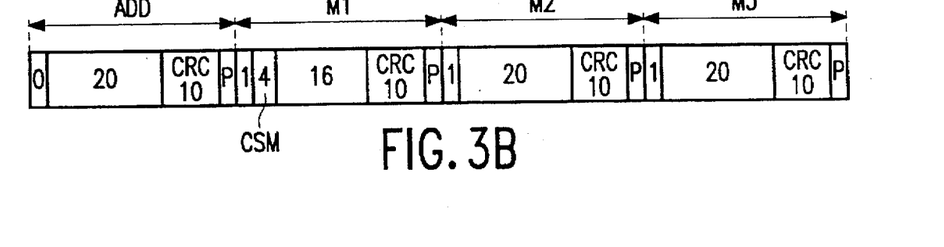
FIG. 3B is a diagram illustrating a second arrangement of an address code word and concatenated message code words.

In the present example shown in FIG. 2 the paging protocol used comprises successive cycles having a duration of 6.8 seconds. Each cycle comprises 3 batches B0,B1,B2, each having a duration of 2.267 seconds and each batch comprises a 32 bit sync code word and n frames each comprising m code words (CW), where for example at a data rate of 6400 bits per second n=28, m=16 and each code word is 32 bits long, however variants of this example are possible. Referring to FIGS. 3A and 3B, each message commences with a 32 bit address code word ADD which is concatenated with a plurality of message code words M. As is customary with POCSAG, the first bit of an address code word has a value "0" and that of a message code word has a value "1". Similarly each type of code word has a 10 bit cyclic redundancy check (CRC) word for error detection followed by an even parity bit (P). In order to guard against falsing at the receiver a checksum CSM is added. In FIG. 3A the checksum CSM is embedded as 4 bits of the address code word leaving 16 bits for the actual address. In FIG. 3B the checksum CSM is embedded in the first message code word M1 or, if provided, in a vector field located between ADD and M1. One method of determining the checksum is to sum the actual message only bits, that is 20 bits per message code word, divide the sum by a polynomial and the remainder is the checksum. The end of a message is denoted by the presence of an address code word relating to the next following message.

Secondary stations SS are allocated to respective predetermined frames of a batch and in order to save current the receiver of a secondary station is controlled to be energized (or active) to receive the sync code word S and subsequently for its pre-allocated frame in the batch. The paging controller 10 (FIG. 1) arranges for messages which are directed to a secondary station to be transmitted commencing in its allocated frame.

In accordance with the present invention the inclusion of a checksum CSM in the address code word or the first message code word provides error protection which enables 2 bit error correction to be applied in each code word. Additionally as will be described it can be used to detect the end of a data message without requiring either an end of message code word or an address or idle code word which may have been lost or corrupted due to a fade.

In operation a secondary station is energized in its pre-allocated frame and receives a sequence of signals. It is assumed for the purposes of illustration that in the sequence there is a message comprising an address code word ADD and three message code words M1, M2, M3 (see FIG. 4A for example). As each code word is received it is error corrected, if required, and stored. Once the first complete code word has been stored, it is decoded and as it is an address code word ADD a check is made to see if it corresponds to one of the address code words allocated to the secondary station. If it is and the address code word contains a checksum, the checksum is stored. In this example the next following code word is a message code word M1 so that after error correction, if applicable, a checksum is calculated by a processor in the receiver using the same algorithm as was used in the paging controller and the calculated checksum is compared with the checksum which has been stored. Assuming that it is not equal the sequence is repeated for the next following message code word M2 and once again the checksums are not equal. The sequence is repeated again with the third message code word M3 and this time, the checksum calculated over 3 message code words does equal the checksum which was stored. The processor in response to receiving an indication that the checksums correspond stops further analysis of the received sequence of signals on the assumption that a complete message has been received. This conclusion is made on the basis of the signals as received without having to verify it by checking if the next following code word is an address or idle code word. An advantage of not having to decode the next following code wore is that it reduces the overhead, which is 25% for a 4 code word message and the fewer the number of code words which have to be decoded the greater the success rate. The complete message which has been decoded may be displayed or stored for later display.

In the event of a fade and one or more code words being corrupted then the checksums may not be equal. Consequently the secondary station when unable to decode a message code word terminates any further analysis because it knows that the checksums will not be equal.

In the event of the secondary station deciding that an address cod word in a received signal is not one of those assigned to it, it does not store the checksum or carry out the calculations on the concatenated message code words.

In order to be able to implement this method successfully it is necessary that the address code word including the checksum (FIG. 3A) is, or the address code word and the message code word containing the checksum (FIG. 3B) are, received and decoded successfully.

In a variant of the above described method, a processor in the secondary station is programmed to look for the next following address or idle code word in order to determine the end of a message. However, the code word by code word checksum calculation and comparison with the embedded checksum is still implemented in order to provide an indication of the end of a message in the event of a transmission being corrupted by the occurrence of a fade. In this variant, the receipt of an address or idle code word takes precedence over a correspondence between the checksums when determining end of a message. As pointed out above it is inherently more reliable to decode fewer rather than more code words.

In order to improve the message success rate at the receiver for any particular carrier to noise power ratio, each message may be transmitted at least twice and for convenience of description each batch is transmitted twice, that is say batch B1 is a duplicate of the batch B0. However, this may not necessarily be the case, it being sufficient that the message be repeated at predetermined times.

Figure 4A:
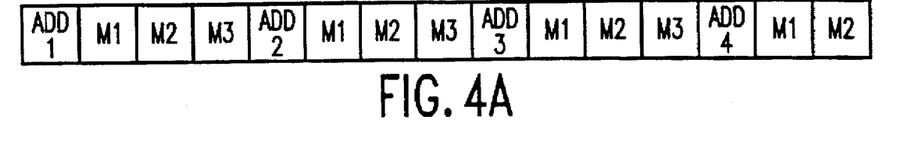
FIG. 4A illustrates the transmission/reception of two concatenated messages in a frame of a batch.

FIG. 4A illustrates a transmission in a frame commencing with address code word ADD1 concatenated with message code words M1,M2,M3. Other messages beginning with respective address code words ADD2,ADD3 are concatenated with the first message. At the secondary station, its receiver is powered up for its respective frame, and, when possible, corrects any errors prior to storing all the code words that might belong to a message for it. Storing will continue, into the following frames if necessary, until a positive indication that the message for the secondary station has terminated, for example the start of a subsequent message for another station is received.

Figure 4B:
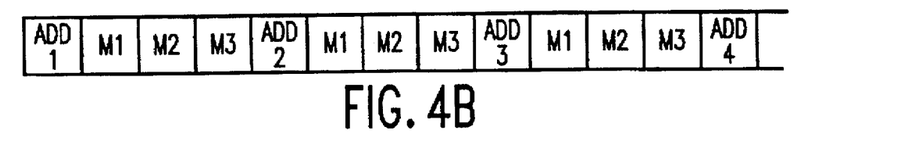
FIG. 4B illustrates the transmission/reception of a repeat of the messages shown in FIG. 4A.
Figure 4C:
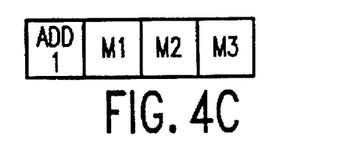
FIG. 4C illustrates assembling a final version of the message in the receiver.

The corresponding code words in the next following batch (FIG. 4B) are received, error corrected, if required, and compared with the corresponding code words stored previously. Decodable code words from the repeat transmission are used to fill in the gaps due to undecodeable code words in the previous transmission. Having decoded an address code word ADD1 which is one assigned to the secondary station, the checksum CSM is noted. For each of the decodeable message code words following ADD1, commencing with M1, a checksum is determined by using the same algorithm as is used to determine the checksum in the message prior to its transmission. The checksum is compared with that in ADD1 and if they do not agree, then the process repeats with M2,M3 and so on until either the checksums do correspond at which point further analysis is terminated because it is assumed that that is the end of the message or another address code word is received. The assembled message is shown in FIG. 4C.

Because an end of message flag or subsequent address code word may be mutilated during transmission and therefore undetectable, solely relying on this detection is undesirable. Working with checksums, in significantly increases transmission reliability.

Once a complete message has been constructed, it will be either be displayed or stored in a RAM for subsequent recall.

In the case of a message being retransmitted 2 or more times then by comparing corresponding code words, a majority decision may be made.

Certain classes of pagers may operate an extended battery economy regime in which apart from detecting say the batch B0 sync code word it is energized for one frame in only one of the 3 batches forming a cycle. In such a situation, the re-transmission of the message will be in the same frame of the corresponding batch of the next following cycle.

Figure 5:
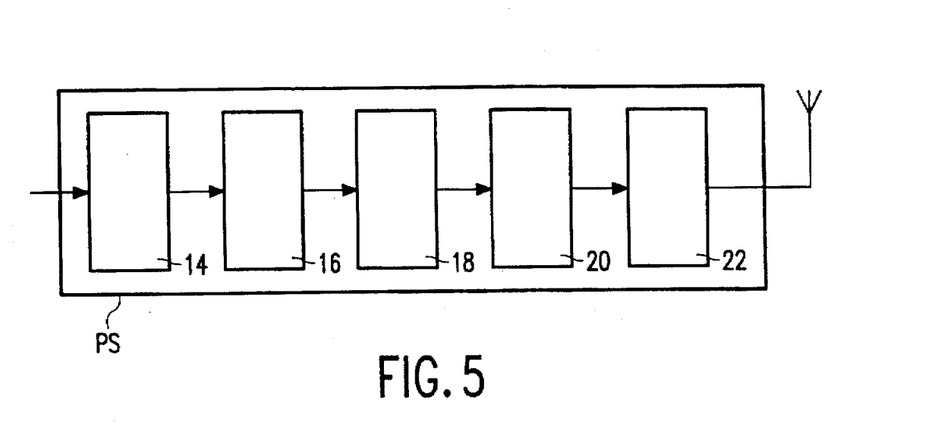
FIG. 5 is a block schematic diagram of a primary station.

FIG. 5 is a block schematic diagram of a primary station PS which in this instance includes means 14 for receiving data to be sent from either an operator controlled keyboard (not shown) or a personal computer (not shown). The data from the receiving means 14 is relayed to a stage 16 in which it is encoded, formatted and a checksum is calculated and added to the address code word or first message code word, as described above. The concatenated address and message code words together with sync code words and batch zero indicator are assembled into a batch in a stage 18 after which the batch is modulated on to a carrier wave in a modulator 20 and is transmitted by a transmitter 22.

Figure 6:
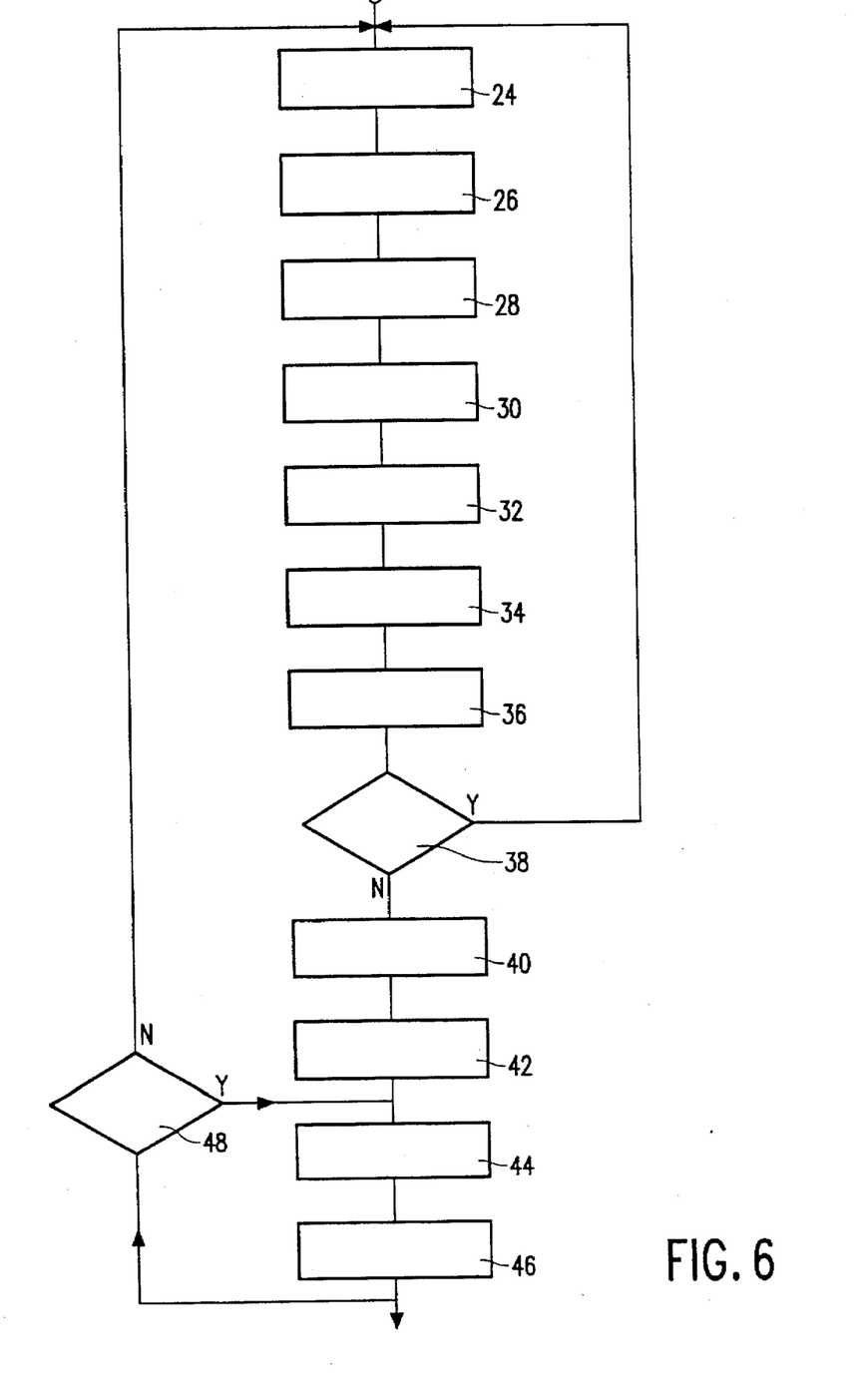
FIG. 6 is a flow chart relating to the operation of the primary station.

FIG. 6 is a flow chart which covers the sequence of operations carried out in the primary station PS.

The flow chart commences at block 24 which relates to the storing of message data which in block 26 is encoded. In block 28 the encoded message data is formatted into code words, which operation includes adding a flag at the beginning of the code word and adding a CRC and even parity to the end of each code word. The block 30 relates to forming the formatted code words into a concatenated string. A checksum CSM is calculated for the entire message in block 32, for example by the method described above, and in block 34 the CSM is embedded in the address code word, first message code word or a vector field between the address and first message code words. The complete message so formed is assembled into a batch of messages, block 36.

In block 38, a check is made as to whether there are any more data messages to be added to the batch being assembled. If the answer is Yes (Y), the flow chart reverts to the block 24 but if it is No (N), the flow chart proceeds to the block 40 in which the sync code word and batch zero marker BZM are added to the assembled batch and the entire batch is stored, block 42. At the appropriate instant as determined by an internal timer, the batch is read-out, modulated (block 44) and transmitted (block 46). A check is made in block 48 if the batch is to be re-transmitted. If the answer is Yes (Y) because the primary station is operating a repeat message mode and at least one repeat is to be transmitted then the flow chart proceeds to the block 44 and if the answer is No (N) because only one transmission is required or the final repeat transmission has been made the flow chart proceeds to the block 24.

Figure 7:
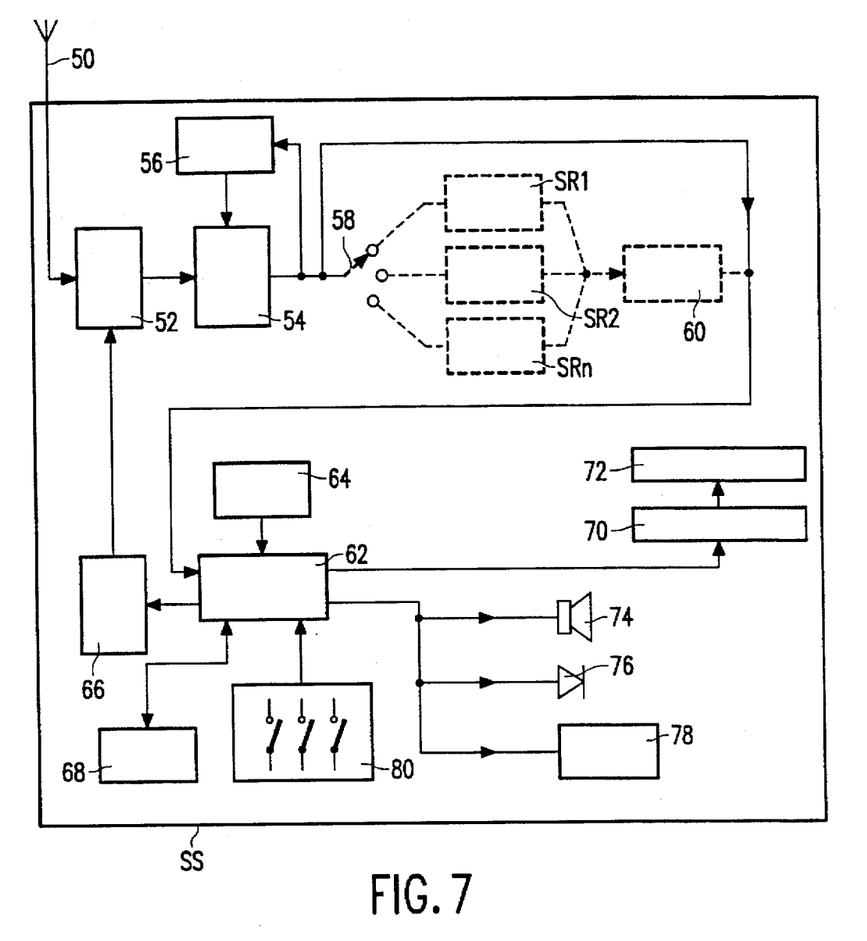
FIG. 7 is a block schematic diagram of a secondary station.

Referring to FIG. 7, the secondary station SS comprises an antenna 50 connected to a receiver 52 which has an output connected to a decoder 54. An address code word detector 56 is connected to the decoder 54. In the case of the secondary station operating on a single transmission of a message, the output of the decoder 54 is connected to the input of a processor 62 which is operated in accordance with a program stored in a ROM 64.

Alternatively in the case of the secondary station processing one or more repeats of a message, the output of the decoder 54 is coupled as shown in broken lines by way of a single pole multiway switching means 58 to a plurality of shift registers SR1 to SRn. A signal combining means 60 has an input which is coupled to the outputs of the shift registers SR1 to SRn and an output coupled to the processor 62.

The processor 62 provides several outputs which include (1) a receiver on/off signal coupled to a power control stage 66 which controls the energisation of the receiver 52, (2) a message output/input coupled to a RAM 68 for storing messages, (3) an output coupled to driver circuitry 70 for displaying on an LCD panel 72 messages read-out of the RAM 68, and (4) annunciating signal output which is supplied to one or more of an acoustic transducer 74, light emitting device 76, for example an LED, and a vibrator 78. A keypad 80 has an output coupled to the processor 62.

Figure 8:
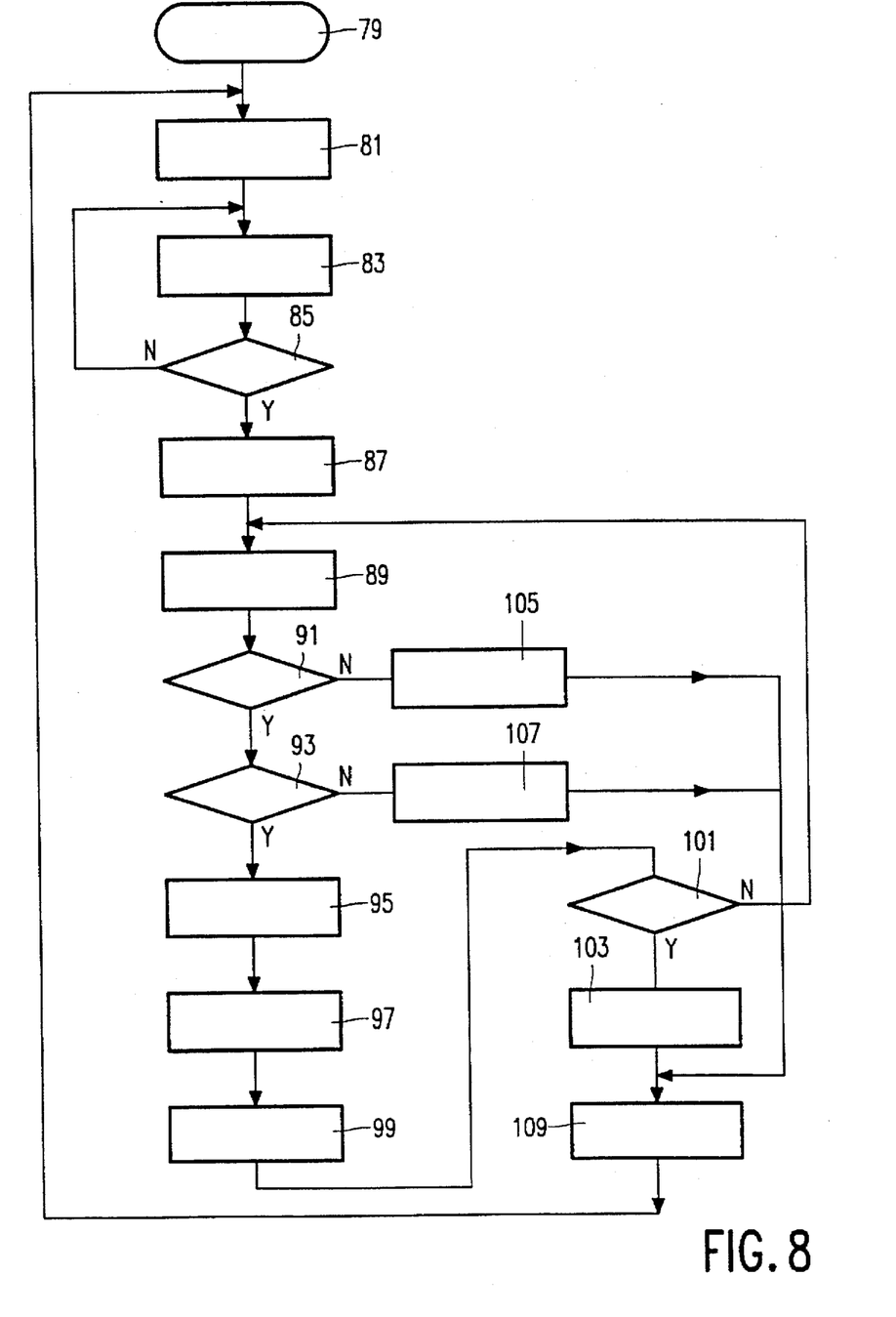
FIG. 8 is a flow chart relating to the operation of the secondary station when there is a single transmission of a data message.

FIG. 8 is a flow chart relating to determining the end of a message which has been transmitted once only.

Block 79 indicates the start of the flow chart. Block 81 denotes energizing the secondary station for its predetermined frame. Block 83 relates to the operations of error correcting and decoding signals received in the frame. Block 85 indicates checking if a decoded address corresponds to one of those allocated to the secondary station. If the answer is No(N) the flow chart reverts to the block 83. However if the answer is Yes(Y), then in block 87, the checksum CSM is recovered from the address code word and stored.

Block 89 denotes error correcting and decoding successive message code words. In block 91 a check is made to see if the message code word is decodable. If the answer is Yes(Y), then in block 93 a check is made if the code word is a message code word. If the answer is Yes (Y) the message code word is concatenated with any previously decoded message code words concatenated with the address code word, block 95. In block 97, a checksum is calculated using the same algorithm as was used in the primary station. The stored and calculated checksums are compared, block 99. In block 101 a check is made to see if the checksums are the same and if they are not the flow chart reverts to the block 89. However, if they are the same, the message is deemed to have been complete and in block 103 the message is displayed and/or stored for display later. Block 109 relates to resetting the flow chart to the block 81.

If the answer from block 91 is No(N) which determines that the message code word is undecodeable then in block 105 the message assembled so far may be discarded or displayed incomplete with a warning. The flow chart proceeds to the block 109.

A No(N) answer from the block 93 indicates that an address or idle code word has been found indicating that the CSM failed to identify the end of the message, perhaps due a false code word in the message. In block 107, the message may be discarded or displayed with a warning. The flow chart proceeds to the block 109.

Figure 9:
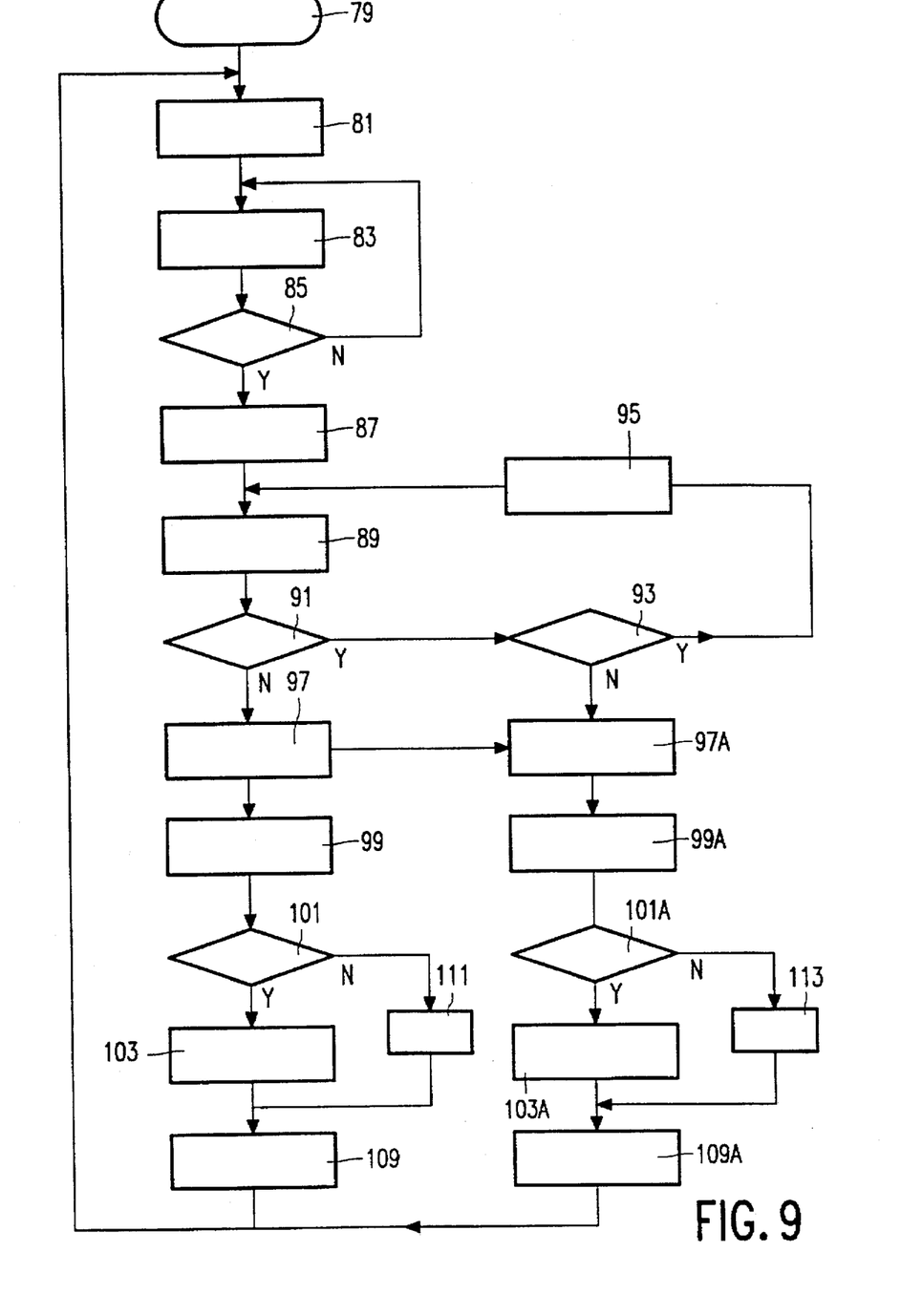
FIG. 9 is a flow chart relating to the operation of the secondary station when decoding a next following code word takes precedence over terminating further decoding when the calculated and embedded checksums correspond.

FIG. 9 is a flow chart relating to determining the end of a message by detection of the next following address code word or an idle code word taking precedence over a correspondence between the CSMs. In the interests of brevity the flow chart up to and including the block 89 will not be described again. In the block 91 a check is made to see if the message code word is decodable. If the answer is Yes(Y), then in the block 93 a check is made to see if the code word is a message code word, if the answer is Yes(Y), then in block 95 it is concatenated with the other message code words and the flow chart returns to the block 89.

If the answer to the block 91 is No(N), then in the block 97 the CSM is calculated from the preceding message code words. In the block 99, the calculated CSM is compared with that embedded in the address code word. first message code word or vector field, as appropriate. In the block 101 a check is made to see if they correspond. If the answer is Yes(Y) then in the block 103 the message is either displayed or stored for later display. If the answer is No(N) then in block 111, the message which is regarded as being incomplete, may be discarded or displayed incomplete with a warning. From blocks 103 and 111 the flow chart proceeds to reset block 109.

If the answer in block 93 is No(N) then with the exception of block 113 replacing the block 111, the flow chart repeats the steps 97 to 109 which for convenience has been identified by the same numbers but with the suffix A. In the interest of brevity these steps will not be repeated. When the answer from the block 101 is No(N) indicating that the received and recalculated CSM differ, suggesting that the CSM failed to identify the end of the message, the message may be discarded or displayed with a warning, block 113.

Figure 10:
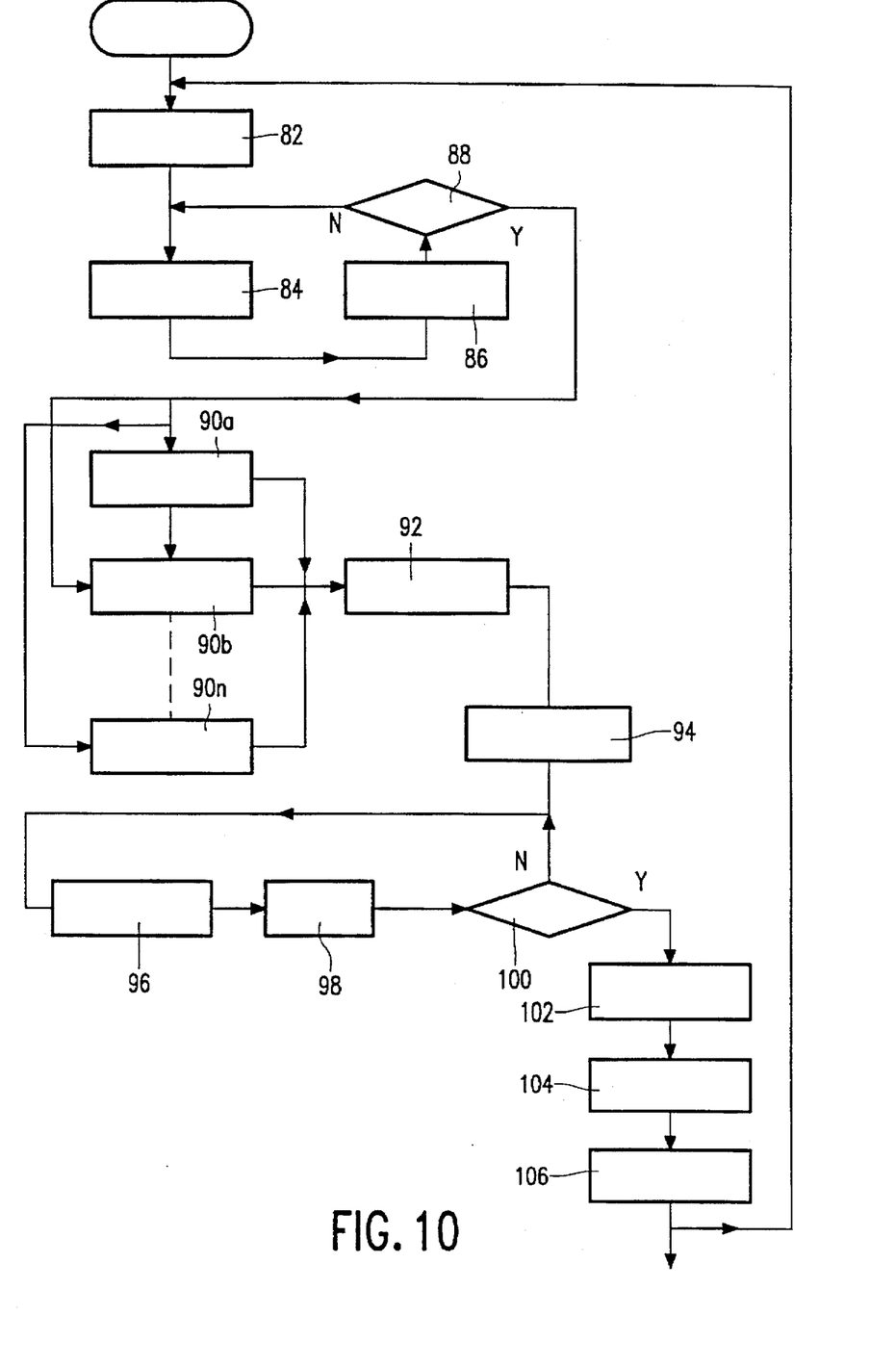
FIG. 10 is a flow chart relating to the operation of the secondary station when a data message is repeated.

FIG. 10 is a flow chart relating to determining the end of a message when the message is repeated. Block 82 relates to the energization of the receiver for a predetermined frame in n successive batches where n is an integer typically between 2 and 4. Block 84 relates to decoding any signals which are received and are capable of being decoded, which operation may include error correcting code words. Block 86 relates to detecting an address code word indicating the commencement of the next following message. The stage 88 relates to checking if an address code word has been detected, if the answer is No (N) then the decoding of received data continues but if the answer is Yes (Y) then the flow chart proceeds to blocks 90a to 90n which relate to storing several transmissions made in the corresponding flames of a predetermined number of batches, the number of repeat transmissions of the same message being a constant of the communication system.

Block 92 relates to combining code words in the respective stored transmissions. One or more of various known techniques may be used, for example selecting a code word which has been correctly error corrected rather than one which has too many errors to be corrected by the error correction algorithm used or using majority logic particularly if three or more transmissions are stored by respective blocks 90a to 90 n. Block 94 denotes recovering and storing the checksum in the address code word. As each code word is concatenated with previously accepted code words in a message store, a checksum is generated block 96. Block 98 denotes comparing the generated checksum with the checksum recovered from the address code word. In block 100 a decision is made as to whether or not they agree, if they do not agree (N) the cycle of combining code words, calculating a new checksum, and comparing checksums is repeated.

If the checksums agree (Y) an end-of-message flag is generated, block 102, which inhibits any further combining of code words and erases any of the data which is stored by operations in blocks 90a to 90n. Block 104 relates to storing the message in the RAM 68 and block 106 relates to resetting the secondary station.

Figure 11:
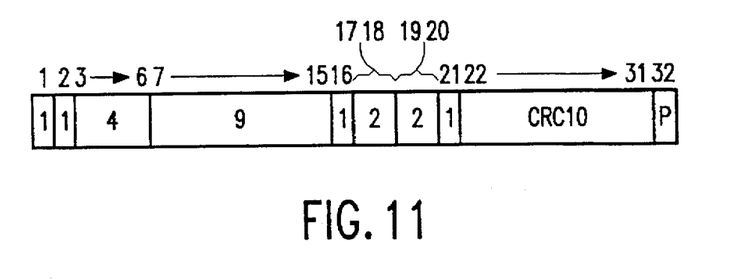
FIG. 11 is a diagram of a batch zero marker.

FIG. 11 illustrates a 32 bit batch zero marker BZM which in its simplest form is used to indicate the first batch in a cycle of several batches, for example 3 high speed batches or 15 batches at 1200b/s. The use of a simple BZM is disclosed in European Patent specification EP-A1-0 554 941. In an upgraded form, the BZM can be used to convey information to a secondary station so that it can adapt itself as required. In one upgrade which is applicable to the present invention, the BZM can indicate to a secondary station that it has to power up once every high speed batch rather than once every cycle.

A BZM which is suited to a method in which a message is repeated 2 or more times is shown in FIG. 11. Essentially the BZM is an address code word having 32 bits and a format which generally accords with a POCSAG address code word. Thus the first bit is used to indicate whether the code word is an address code word or a message code word, bits 22 to 31 are the CRC and bit 32 provides for even parity.

Bit 2 is used to indicate whether the purpose of the code word is as a BZM or as an address of a secondary station. Bits 3 to 6 are used to identify the system operator and bits 7 to 15 identify the area. Bit 16 is used to distinguish between whether the code word is a BZM or a BZM message. Bits 17 and 18 are used to indicate how many times the message is being repeated, 2 bits will enable up to four conditions for example 0, 1, 2 or 3 to be signalled. Bits 19 and 20 are used to identify which repeat is being transmitted in the current batch and bit 21 is used to indicate if the system is operating in cycle or batch mode.

Although not described in detail, in the event of an undecodeable code word being received and the end of a message is detected by the receipt of an address or idle code word, the embedded checksum may be used in a more conventional way as a raising check.

From reading the present disclosure, other modifications will be apparent to persons skilled in the art. Such modifications may involve other features which are already known in the design, manufacture and use of communication systems and component parts thereof and which may be used instead of or in addition to features already described herein. Although claims have bene formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

We claim:

1. A method of transmitting and receiving data messages, comprising the steps of compiling a message from a plurality of code words, calculating a checksum for the message and embedding the checksum in the message; transmitting the message; receiving the transmitted message; recovering the code words; storing successive code words; after each code word has been stored, determining the checksum using the same algorithm as used to determine the checksum in the originally transmitted message, and, if the checksum so determined corresponds to that embedded in the originally transmitted message, recording this correspondence.

2. A method as claimed in claim 1, wherein response to recording said correspondence the message is treated as being complete.

3. A method as claimed in claim 1, including the steps of decoding stored code words until an address code word is noted and in response thereto treating the message up to the previous code word as being complete.

4. A method as claimed in claim 1, including the steps decoding successive stored code words in turn until an undecodable code word is detected, checking if said correspondence has been obtained and, if so, treating the message up to and including the code word providing said correspondence as a complete message.

5. A method as claimed in claim 1, wherein a message comprises an address code word and concatenated message code words, wherein the checksum is embedded in the address code word.

6. A method as claimed in claim 1, wherein a message comprises an address code word and concatenated message code words, and the checksum is embedded in the message code word concatenated with the address code word.

7. A method as claimed in claim 1, including the steps of transmitting each message at least twice; receiving the first transmission of the message; error correcting the code words if required; decoding each code word and storing the decoded code word; receiving each repeat of the message, error correcting the code words of each received message repeat, if required; decoding each code word, storing the repeated message code word by code word; commencing with the stored version of the first message, assembling a final version of the message by comparing corresponding code words in the first message and each repeat thereof; after each code word has been added to the final version of the message being assembled, determining the checksum using the same algorithm as used to determine the checksum in the originally transmitted message, and, if the checksum so determined corresponds to that embedded in the originally transmitted message, terminating further comparison of the original and the repeated message(s).

8. A method as claimed in claim 1, wherein the code words are transmitted bit interleaved and are de-interleaved on being received.

9. A method of communicating messages, comprising encoding and formatting data to be transmitted; determining a checksum for said encoded and formatted data and embedding the checksum in the formatted data to form a message, and transmitting the message at least twice at predetermined intervals for each transmission of the same message, receiving and decoding message data in the respective batches and storing the decoded data; determining, by considering the corresponding code words in the decoded data, which of the code words is correct, and storing the correct code word and substantially simultaneously computing a checksum with respect to the stored correct code words, whereby when the checksum computed equals the checksum embedded in the formatted data it is concluded that a complete message has been received and further analysis of the stored message is terminated.

10. A method as claimed in claim 9, wherein the messages are transmitted in a predetermined frame of at least two concatenated batches, in that the decoded message or concatenated messages present in the predetermined frame of the first of the at least two batches is stored, in that the decoded message code words present in the same predetermined frame of the second and optionally subsequent batches are stored code word by code word until an indication of the end of a message is noted.

11. A method as claimed in claim 9, wherein the checksum is embedded in an address code word which is concatenated with data code words.

12. A system for transmitting and receiving data messages, comprising means for calculating and embedding a checksum in each message, means for receiving the transmitted message, means for error correcting the message, if required, means for storing successive code words, means responsive to the addition of each code word to the stored code words, for determining a checksum using the same algorithm as was used to calculate the checksum in the originally transmitted message, and means for recording when the determined checksum corresponds to that embedded in the originally transmitted message.

13. A system for transmitting and receiving data messages, comprising means for calculating and embedding a checksum in each message, means for transmitting the message and at least one repeat thereof, means for receiving the original transmission of the message and each repeat of the message, means for error correcting the message and each repeat thereof, if required, means for storing successive code words of the message by storing the repeated message (s) code word by code word, means for assembling a final version of the message and for comparing corresponding code words in the originally received message and each repeat thereof, means, responsive to the addition of each code word to the final version of the message being assembled, for determining the checksum using the same algorithm as used to calculate the checksum in the originally transmitted message, means for determining that a complete message has been received in response to the calculated checksum corresponding to that embedded in the originally transmitted message, and means for terminating further comparison of the original and the repeated message(s).

14. A communication system comprising means for encoding and formatting data to be transmitted, means for calculating a checksum for said encoded and formatted data and embedding the checksum in the formatted message, means for transmitting the message, means for receiving the transmitted message, means for decoding message code words, means for storing the decoded code words, means responsive to the storing of each code word for computing a checksum, means for comparing the checksum computed with the checksum embedded in the transmitted message, and means for determining that the checksums are the same and, in response thereto, for inhibiting further comparison of the checksums and for storing the correct code words as a complete message.

15. A primary station for use in the communication system as claimed in claim 14, comprising means for encoding and formatting data to be transmitted, means for determining a checksum for said encoded and formatted data and embedding the checksum in the formatted data to form a message.

16. A secondary station for use in the communication system as claimed in claim 14, comprising means for receiving a transmitted message, means for decoding code words comprising the message, means for storing the decoded code words, means responsive to the storing of each code word for computing a checksum, means for comparing the checksum computed with the checksum embedded in the formatted message as transmitted, and means for recording when the computed and embedded checksums correspond.

* * * * *